US009963921B1

(12) United States Patent
Kamkar et al.

(10) Patent No.: US 9,963,921 B1
(45) Date of Patent: May 8, 2018

(54) ACCESS CONTROL ELECTRO-PERMANENT MAGNETIC LOCK

(71) Applicant: OpenPath Security Inc., Marina Del Rey, CA (US)

(72) Inventors: Samy Kamkar, Los Angeles, CA (US); Robert J. Peters, Culver City, CA (US); Alexander A. Kazerani, Santa Monica, CA (US)

(73) Assignee: OPENPATH SECURITY INC., Marina Del Rey, CA (US)

( * ) Notice: Subject to any disclaimer, the term of this patent is extended or adjusted under 35 U.S.C. 154(b) by 0 days. days.

(21) Appl. No.: 15/679,275

(22) Filed: Aug. 17, 2017

(51) Int. Cl.

| | |
|---|---|
| ***G05B 23/00*** | (2006.01) |
| ***E05C 19/16*** | (2006.01) |
| ***H01F 7/02*** | (2006.01) |
| ***H01F 7/04*** | (2006.01) |
| *G07C 9/00* | (2006.01) |
| *E05B 47/00* | (2006.01) |

(52) U.S. Cl.
CPC ........ *E05C 19/166* (2013.01); *E05B 47/0038* (2013.01); *G07C 9/00944* (2013.01); *H01F 7/0263* (2013.01); *H01F 7/04* (2013.01); *E05B 2047/0058* (2013.01); *E05B 2047/0097* (2013.01); *G07C 2009/00761* (2013.01)

(58) Field of Classification Search
CPC ... H02K 49/10; E05C 19/166; E05B 47/0038; G07C 9/00944; H01F 7/0263; H01F 7/04
See application file for complete search history.

(56) References Cited

U.S. PATENT DOCUMENTS

| | | | | |
|---|---|---|---|---|
| 4,134,539 | A * | 1/1979 | Hopkinson | G06K 7/016 235/449 |
| 2008/0256872 | A1* | 10/2008 | Finke | E05F 15/603 49/360 |
| 2010/0031714 | A1* | 2/2010 | Brown | E05B 47/00 70/91 |
| 2012/0062048 | A1* | 3/2012 | Kaneko | H02K 7/06 310/20 |

* cited by examiner

*Primary Examiner* — Omeed Alizada
(74) *Attorney, Agent, or Firm* — Los Angeles Patent Group; Arman Katiraei

(57) ABSTRACT

Provided is an access control electro-permanent magnetic lock for locking and unlocking physical barriers with electromagnetism, but without a continual power source. The lock comprises permanent magnets juxtaposed with electro-permanent magnets. The polarity of the permanent magnets is fixed and aligned. The polarity of the electro-permanent magnets can be switched by introducing a pulse of electric current for a fraction of a second at low voltage to the electro-permanent magnets. A strong magnetic field generating a locking or holding force is produced when the polarity of the electro-permanent magnets aligns with or is in the same direction as the polarity of the permanent magnets. The magnetic field is canceled such that there is no locking or holding force when the polarity of the electro-permanent magnets is opposite to the polarity of the permanent magnets. The lock can further provide fail-secure or fail-safe protections in the event of power loss.

20 Claims, 6 Drawing Sheets

ACCESS CONTROL ELECTRO-PERMANENT MAGNETIC LOCK

BACKGROUND ART

Electric strikes and electromagnetic locks have replaced mechanical or deadbolt locks in most commercial settings. These types of locks are smaller than mechanical or deadbolt locks and more convenient by virtue of unlocking significantly faster than their mechanical or deadbolt counterparts and eliminating the need to carry different keys to access different doors.

An electric strike is an electronically controlled latch that engages a latchbolt of a door. The door becomes locked when the latchbolt slides behind the latch and the latch is secured. An electric current can be supplied to or removed from the electric strike (depending on the electric strike configuration) in order release the latch. Consequently, when the door is opened, the latchbolt pushes against the released latch causing the latch to pivot or move and the latchbolt to slide out from behind the latch. While popular with wooden, steel, or other thick doors that include a latchbolt, electric strikes are not used for transparent doors (e.g., glass doors) or thin doors where the dimensions or aesthetic does not support latchbolts, deadbolts, or other mechanical locking mechanisms.

Electromagnetic locks are suitable for any type of door including transparent and thin doors where no latchbolt or minimal hardware is desired on the door. Locking and unlocking a door with an electromagnetic lock requires little more than a small armature plate affixed somewhere on the door (e.g., top, bottom, or side). The armature plate is a piece of metal or alloy that is attracted to a magnetic force. The electromagnetic lock creates the magnetic force by energizing a magnetic coil housed about the door frame. The magnetic coil is typically a wire or solenoid connected to a power source that wraps around a ferromagnetic or other core. Electric current running through the magnetic coil creates a strong magnetic field attracting the armature plate affixed to the door, thereby locking the door and preventing opening or further movement of the door.

Electromagnetic locks have several shortcomings that limit their applications. For one, electromagnetic locks require a continual current or power source of several hundred milliamps at high voltage (e.g., 12 or 24 volts) to maintain a lock. This requires wiring to the electromagnetic locking mechanism about the door frame and renders the electromagnetic lock unsuitable for extremely low power applications or where wiring is inaccessible. The continual power source also renders the electromagnetic lock fail-safe but not fail-secure. In other words, the electromagnetic lock automatically unlocks in the event of power loss. Accordingly, electromagnetic locks are not used where it is critical to maintain a locked state in the event of power loss. Transparent or thin doors are therefore not used for such situations because the electromagnetic lock is the most compatible lock for these types of doors and such locks do not provide adequate fail-secure protections. The same applies when considering use of electromagnetic locks for gates, windows, and other barriers that require fail-secure protections, or in applications of electromagnetic locks that rely on a battery source instead of a continual power source and the discharging of the battery can occur when the fail-secure protection is desired.

There is therefore a need for a new locking mechanism that preserves the dimensional and aesthetic compatibility of electromagnetic locks, but eliminates the need for a continual current or power source. There is further a need to provide fail-secure or fail-safe protections for such a new locking mechanism so that its applications are not limited and can be used when it is desired to maintain a lock in the event of power loss. Such a locking mechanism would permit for the use of transparent, thin access doors, or other barriers that do not have a latchbolt in new applications previously limited by the shortcomings of traditional electromagnetic locks.

BRIEF DESCRIPTION OF THE DRAWINGS

A preferred embodiment for an access control electro-permanent magnetic (ACEPM) lock will now be described, by way of example only, with reference to the accompanying drawings in which.

DETAILED DESCRIPTION

An access control electro-permanent magnetic (ACEPM) lock is a new locking mechanism for locking and unlocking doors, gates, and other physical barriers using electromagnetism without a continual power source. The ACEPM lock is energized for a fraction of a second with a low current at low voltage to change between locked and unlocked states. Once in a locked or unlocked state, the ACEPM lock maintains that state without further power consumption. Accordingly, the ACEPM lock can be adapted for fail-secure protections in which retention of a locked state is desired in the event of power loss, or for fail-safe protections in which retention of an unlocked state is desired in the event of power loss.

The ACEPM lock is of a similar form factor to electromagnetic locks and similarly comprises an armature plate that is mounted on the door to provide the lock and unlock functionality. This dimensional and aesthetic compatibility with electromagnetic locks renders the ACEPM lock suitable for access control of transparent physical barriers, thin physical barriers, or other physical barriers that lack a latchbolt or other mechanical hardware for locking the physical barrier. However, unlike electromagnetic locks, the ACEPM lock provides the fail-secure or the fail-safe protections in the event of power loss, thereby enabling new applications for all forms of physical barriers.

Figure 1:
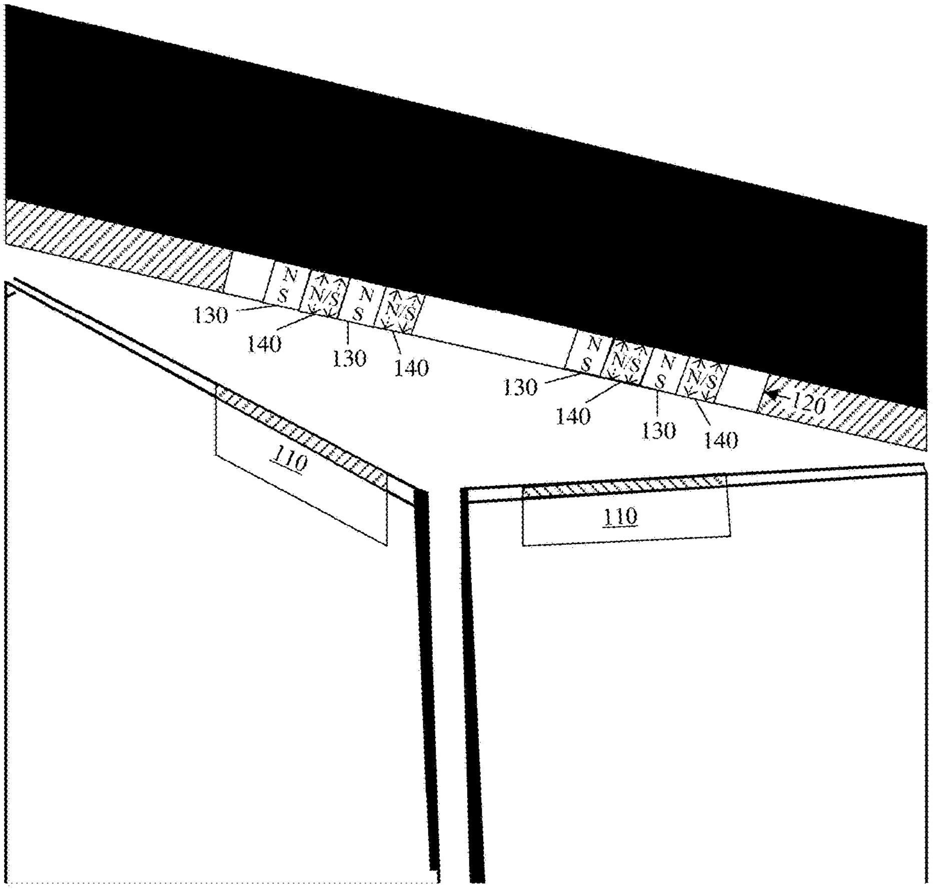
FIG. 1 provides external perspective views of the ACEPM lock system in accordance with some embodiments.

FIG. 1 provides external perspective views of the ACEPM lock system in accordance with some embodiments. As shown, the ACEPM lock system is formed from an armature plate 110 and the ACEPM lock 120.

The armature plate 110 is similar to those found in traditional electromagnetic locking systems. In some embodiments, the armature plate 110 is a flat or U-shaped piece of metal or alloy that is attracted to a magnetic force. The armature plate 110 is affixed to the physical barrier. Screws, nuts and bolts, or tongue and groove joints can be used to affix the armature plate 110 to the physical barrier. In some embodiments, the armature plate 110 is embedded or integrated as part of the physical barrier. For instance, a door may have a metallic border that serves as the armature plate 110. The armature plate 110 size varies according to the desired amount of holding force. The larger the armature plate 110 surface area and the magnets of the ACEPM lock 120, the greater the locking or holding force securing the door. The system can provide over a thousand pounds of holding force with an armature plate 110 having a sufficiently large surface area (e.g., ten square inches). The holding force can also increase or decrease depending on the size and magnetic properties of the magnets, metals, or alloys used for the armature plate 110 and the ACEPM lock 120.

The exterior of the ACEPM lock 120 comprises one or more permanent magnets 130 juxtaposed with one or more electro-permanent magnets 140. The holding force of the ACEPM lock 120 can be increased with additional magnets, larger magnets, or materials with greater magnetic properties.

The polarity of the one or more permanent magnets 130 is fixed and aligned with one another, whereas the polarity of the one or more electro-permanent magnets 140 can be switched or reversed. In other words, the polarity of the electro-permanent magnets 140 can be either in the same direction as or in an opposite direction than the polarity of the permanent magnets 130. The polarity of the electro-permanent magnets 140 is reversed by providing a brief pulse of electric current to the electro-permanent magnets 140.

The system locks when the polarity of the electro-permanent magnets 140 aligns with or is in the same direction as the polarity of the permanent magnets 130. In this state, the electro-permanent magnets 140 augment or amplify the magnetic field from the permanent magnets 130, thereby creating a holding force that engages the armature plate 110 when the plate 110 comes in range of the magnetic field.

The system unlocks when the polarity of the electro-permanent magnets 140 is opposite to the polarity of the permanent magnets 130. The opposite polarities cause the electro-permanent magnets 140 to cancel the magnetic flux from the permanent magnets 130, thereby removing any magnetic field experienced by the armature plate 110. In this state, the armature plate 110 as well as the physical barrier to which the armature plate 110 is affixed can freely move past the ACEPM lock 120 without experiencing a holding force.

Figure 2:
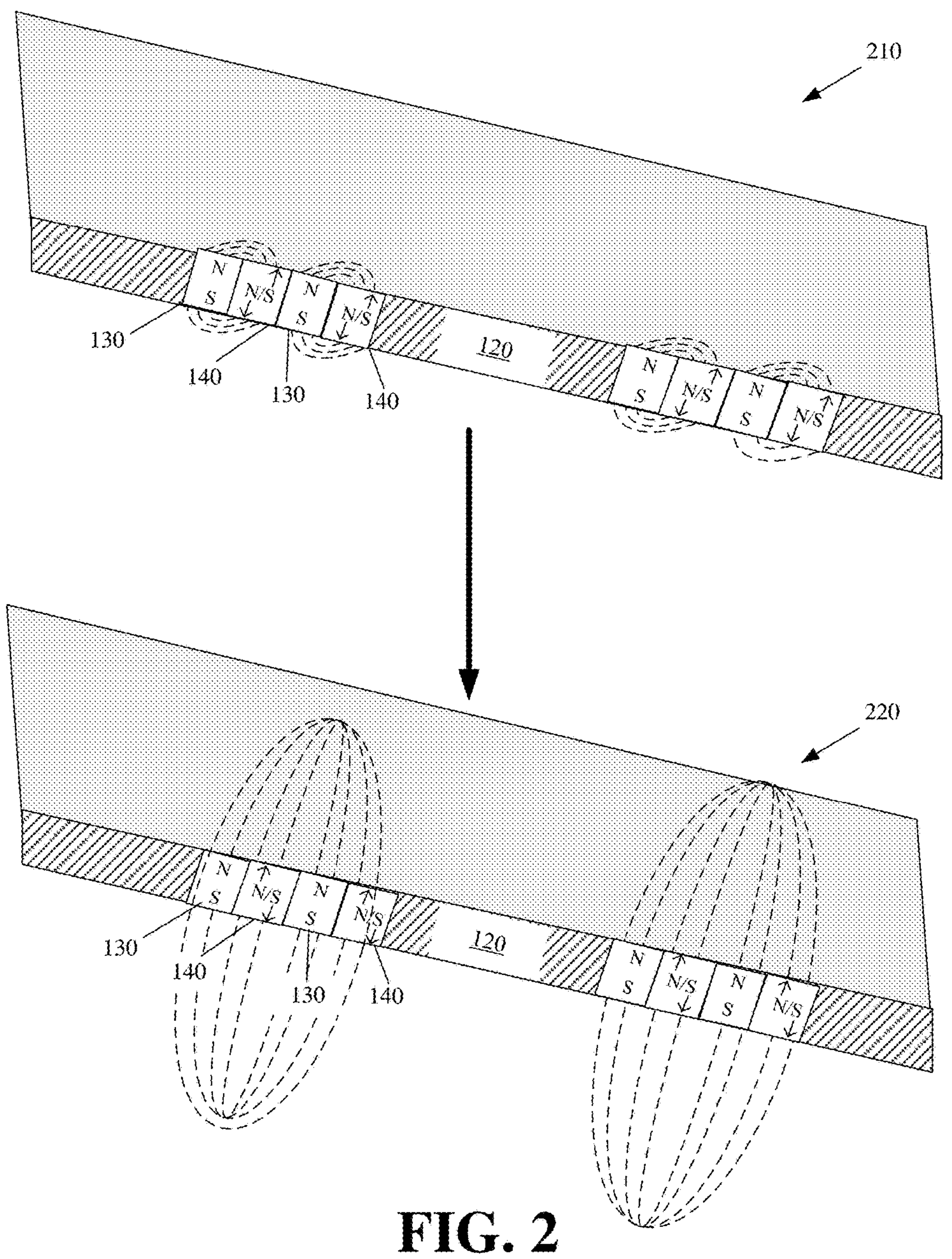
FIG. 2 conceptually illustrates locking and unlocking the ACEPM lock by switching polarity of the electro-permanent magnets in accordance with some embodiments.

FIG. 2 conceptually illustrates locking and unlocking the ACEPM lock 120 by switching polarity of the electro-permanent magnets 140 in accordance with some embodiments. The figure initially shows the ACEPM lock 120 in an unlock state 210 due to the polarity of the electro-permanent magnets 140 being in an opposite direction than the polarity of the permanent magnets 130 of the ACEPM lock 120. In this initial unlock state 210, the magnetic flux from the permanent magnets 130 is canceled by the opposite polarity of the electro-permanent magnets 140. This allows a physical barrier with an armature plate to pass by the ACEPM lock 120 without resistance.

A pulse of electric current is then applied to the electro-permanent magnets 140 to change from the initial unlock state 210 to a lock state 220. The pulse switches polarity of the electro-permanent magnets 140 such that the polarity of the electro-permanent magnets 140 aligns with the polarity of the permanent magnets 130. The alignment of polarity augments or amplifies the magnetic field from the permanent magnets 130. Now when the armature plate passes by the ACEPM lock 120, the magnetic field will attract and hold the armature plate, thereby preventing the physical barrier affixed with the armature plate to move past the ACEPM lock 120.

Figure 3:
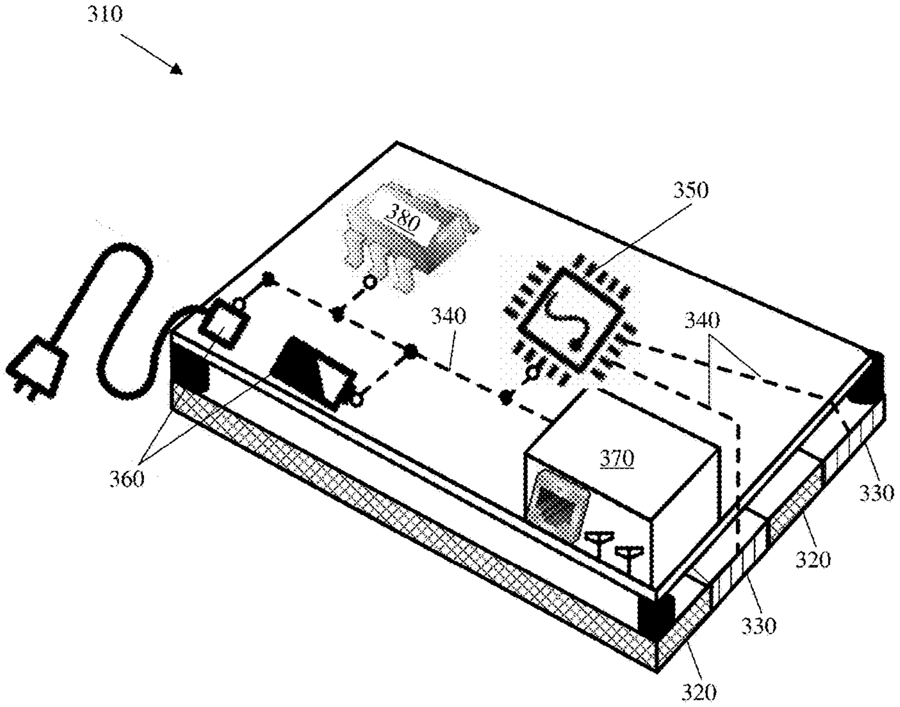
FIG. 3 conceptually illustrates internal components of the ACEPM lock in accordance with some embodiments.

FIG. 3 conceptually illustrates internal components of the ACEPM lock 310 in accordance with some embodiments. The figure illustrates a printed circuit board (PCB) that is coupled to the one or more permanent magnets 320 and the one or more electro-permanent magnets 330. The PCB houses the components for switching the polarity of the electro-permanent magnets 330 and for implementing the fail-safe or fail-secure protections. The components for switching the electro-permanent magnet polarity include wiring 340, a pulse generating circuit 350, one or more power sources 360, a communication port 370, and firmware or memory 380. It should be noted that the ACEPM lock contains no moving parts.

The wiring 340 communicably couples the pulse generating circuit 350 to the electro-permanent magnets 330. In some embodiments, the wiring 340 connects the pulse generating circuit 350 to both ends of the electro-permanent magnets 330, thereby allowing the pulse generating circuit 350 to change which end of the electro-permanent magnets 330 the pulse of electric current is sent to. The wiring 340 further connects the pulse generating circuit 350 to the one or more power sources 360, communication port 370, and firmware or memory 380.

The pulse generating circuit 350 generates the pulse of electric current that switches the electro-permanent magnet polarity. In some embodiments, the pulse generating circuit 350 sends the pulse of electric current in a first direction through the wires 340 to align the polarity of the electro-permanent magnets 330 with the polarity of the permanent magnets 320, and sends the pulse of electric current in an opposite direction through the wires 340 to switch the polarity of the electro-permanent magnets 330 to be opposite to the polarity of the permanent magnets 320.

In some embodiments, the pulse generating circuit 350 generates a 100-800 milliamp pulse at 3.3 or 5 volts for 100-500 milliseconds to change the polarity of the electro-permanent magnets 330. This is the total power draw and time for switching the ACEPM lock 310 between locked and unlocked states. Different embodiments may use different voltages (higher or lower) and different current (higher or lower) to switch the polarity of the electro-permanent magnets 330. In any such embodiments, the power draw of the ACEPM lock 310 compared to traditional electromagnetic locks is exponentially less because the ACEPM lock 310 does not draw continual power to maintain a state.

The one or more power sources 360 include an onboard power source, an external power source, or combination of both. An onboard power source can be used since the ACEPM lock 310 is so low power (i.e., 100-800 milliamp pulse at 3.3 or 5 volts for 100-500 milliseconds each time it is locked and unlocked). In some embodiments, the onboard power source is a battery. An onboard battery of 4,000 milliamp hours can power the ACEPM lock 310 for several years under normal usage (e.g., 40 state changes per day). In some embodiments, the onboard power source is rechargeable. An optional solar cell with a battery charging circuit (not shown) can be coupled to or integrated as part of the ACEPM lock 310 in order to recharge the onboard power source and lengthen the period of time (potentially indefinitely) with which the ACEPM lock 310 can operate solely on the onboard power source. Some embodiments generate current to recharge the onboard power source from the swinging of the armature plate past the ACEPM lock 310. Capacitors and other power storage technologies can be used as the onboard power source.

Alternatively, the power source 360 may be provided from external sources. For example, the ACEPM lock 310 may use wired ethernet connectivity to communicate with an access control unit or reader. In such cases, power-over-ethernet serves as the external power source supplying power to the ACEPM lock 310. One or more power conductors can also supply the ACEPM lock 310 with the power it needs to run.

Some embodiments of the ACEPM lock 310 include both the external power source and the onboard power source. In some such embodiments, the external power source recharges the onboard power source and further powers the ACEPM lock 310 during normal operation, wherein the onboard power source is a battery or capacitor. In the event that the external power source is lost, the ACEPM lock 310 can continue to operate with the onboard power source, or at the very least, to implement fail-safe or fail-secure protections using power from the onboard power source. Additional components for implementing the fail-safe or fail-secure protections are illustrated with reference to FIG. 4 below.

The communication port 370 receives signaling that triggers the locking and unlocking of the ACEPM lock 310. The communication port 370 includes network connectivity. The network connectivity allows the communication port 370 to receive the signaling from external devices.

In some embodiments, the signaling is in the form of unlock and/or lock commands. The communication port 370 forwards the commands as unlock or lock input to the pulse generating circuit 350. The commands originate from one or more of an access control unit, a cloud based server, a reader, or a mobile device. The access control unit, cloud based server, reader, or mobile device issue the commands after receiving user or client device requests to access a space through the barrier under control of the ACEPM lock 310, and authorizing the access based on the requests and access permissions configured for the user or client device. The external devices may issue just one of the unlock or lock commands with the ACEPM lock 310 automatically executing the opposite command after a configured amount of time. The signaling from these external devices can also update operations or firmware 380 of the ACEPM lock 310.

The communication port 370 can also act as the reader. In some such embodiments, the communication port 370 receives unlock or lock requests from the client device upon the client device establishing network connectivity with the ACEPM lock 310. The requests from the client device may include access credentials, authentication tokens, or other information with which access permissions of the client device can be determined. The ACEPM lock 310 forwards the unlock or lock requests from the client devices to a remote access control unit or cloud server using network connectivity of the communication port 370. The access control unit or cloud server responds to the ACEPM lock 310 with lock or unlock commands should the client device be successfully authorized by the access control unit or cloud server. In some other embodiments, the authorization is performed locally by the ACEPM lock 310. In some such embodiments, the ACEPM lock 310 authorizes access locally based on access credentials or authentication tokens stored to the ACEPM lock 310 firmware or memory 380. The authorization can be performed by a processor (not shown) that is integrated with or separate from the pulse generating circuit 350. The access credentials or authentication tokens stored to the ACEPM lock 310 firmware or memory 380 can be periodically updated by the signaling received through the communication port 370.

The communication port 370 network connectivity can support messaging formats of one or more networking protocols (e.g., Internet Protocol, Transmission Control Protocol, User Datagram Protocol, HypterText Transfer Protocol, etc.). The communication port can also support basic signaling. For example, the communication port 370 may have wired connectivity to a button, switch, or motion sensor that generates a binary signal for locking and unlocking the ACEPM lock 310.

Wireless connectivity may be in the form of a wireless radio implementing the Bluetooth protocol, Bluetooth Low Energy (BLE) protocol, or other short-range low power wireless networking protocol. Short-range low power wireless radios are preferred when minimizing total ACEPM lock 310 power consumption or when operating solely from an onboard power source. Short-range low power wireless radios allow the ACEPM lock 310 to communicate with and receive lock and unlock requests and commands from nearby network devices such as a smartphone or laptop computer. For example, the smartphone may authenticate the user seeking access to a door under control of the ACEPM lock 310, and upon successful authentication, the smartphone sends an unlock command to the ACEPM lock 310 after establishing a Bluetooth connection with the ACEPM lock 310.

In some embodiments, the communication port 370 has a long-range wireless radio such as WiFi or Long Term Evolution (LTE). Since these wireless radios draw more power than Bluetooth, BLE, and other short-range wireless radios, the communication port 370 may be activated for short periods of time when using an onboard power source or be continually active when using an external power source. The long-range wireless radios allow the ACEPM lock 310 to receive signaling from more distant devices such as an access control unit remotely located within a building or a remote cloud server.

In some embodiments, the firmware or memory 380 is also leveraged in providing the fail-safe or fail-secure protections. In some such embodiments, a portion of the firmware or memory 380 is used as a state tracking circuit for tracking the current state of the ACEPM lock 310 (i.e., whether locked or unlocked).

Additional components of the ACEPM lock for implementing fail-safe or fail-secure protections include a state override circuit as well as inclusion of both the external power source and the onboard power source. In some embodiments, the inputs to the state override circuit include wiring communicably coupling the state override circuit to the external power source and the state tracking circuit. The state override circuit is also communicably coupled with wiring to the pulse generating circuit in order to send unlock or lock commands in the event that fail-safe or fail-secure protections are triggered. Since the fail-safe or fail-secure protections are triggered in the event of loss of power from the external power source, the state override circuit and the pulse generating circuit receive and draw power from the onboard power source when there is an interruption in power transfer from the external power source.

Figure 4:
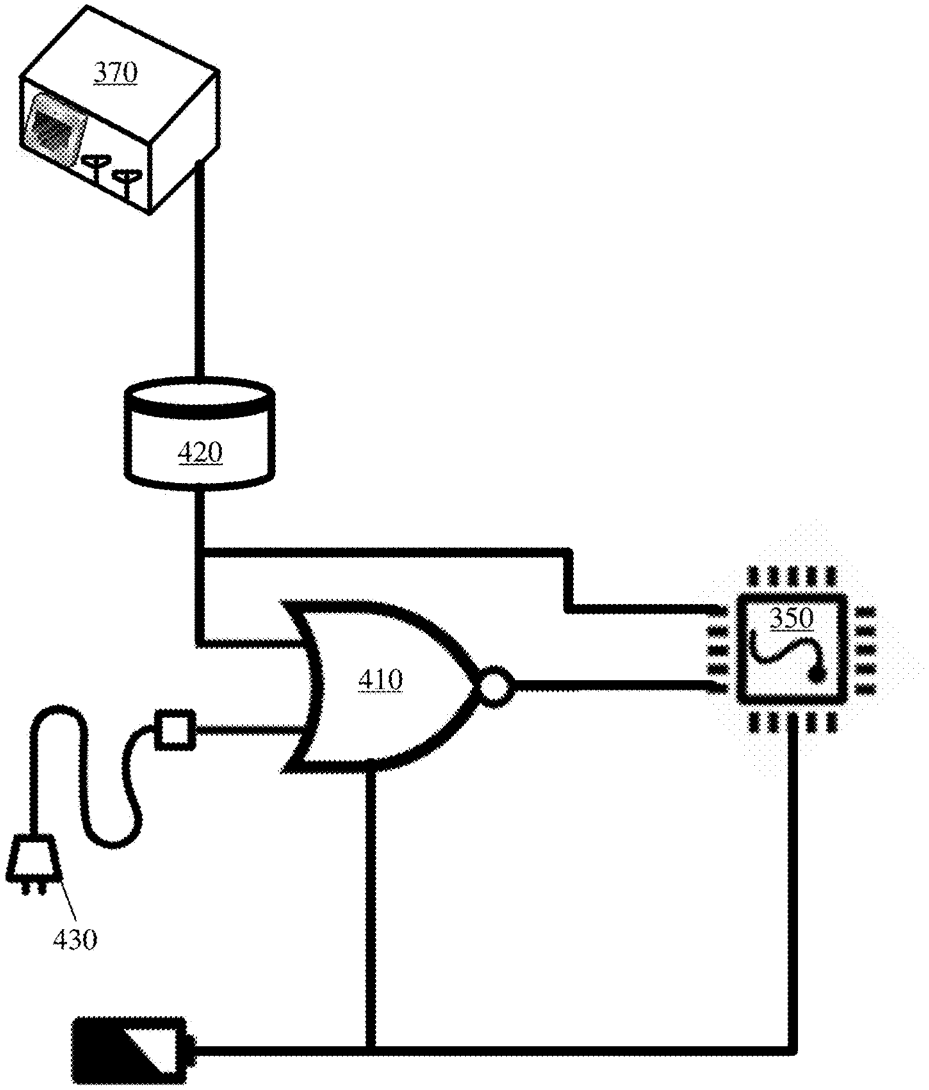
FIG. 4 illustrates a conceptual circuit diagram for implementing fail-secure protections with the state override circuit and the state tracking circuit of the ACEPM lock in accordance with some embodiments.

FIG. 4 illustrates a conceptual circuit diagram for implementing fail-secure protections with the state override circuit 410 and the state tracking circuit 420 of the ACEPM lock in accordance with some embodiments. The state tracking circuit 420 can be a non-volatile register, latch, or flip-flop. The state override circuit 410 can be a NOR gate. These simplified representations are for illustrative purposes. Additional complexities of the actual implementation are obscured such that actual implementation and other embodiments can differ while still implementing the desired fail-secure functionality illustrated by FIG. 4.

The state tracking circuit 420 is communicably coupled to the communication port 370 with a wired connection. An unlock signal that passes from the communication port 370 through the state tracking circuit 420, sets the state tracking circuit 420 to 0, and continues to the pulse generating circuit 350 to unlock the ACEPM lock. Similarly, a lock signal that passes from the communication port 370 through the state tracking circuit 420, sets the state tracking circuit 420 to 1, and continues to the pulse generating circuit 350 to lock the ACEPM lock. If the signal received at the communication port 370 is for the same state that the ACEPM lock is already in, then the signal will have no effect on the lock or the state tracking circuit 420.

The state override circuit 410 receives inputs from the external power source 430 and the state tracking circuit 420. From the external power source 430 input, the state override circuit 410 detects when external power is lost. The input falls low or is 0 when power from the external power source 430 is lost.

In response to losing power from the external power source 430 and the state tracking circuit 420 tracking an unlock state, the state override circuit 410 goes high. Otherwise, when the external power source 430 provides continual power or the state tracking circuit 420 tracks a lock state, the state override circuit 410 stays low or a value of 0.

In response to the output from the state override circuit 420 going high, a lock command is issued to the pulse generating circuit 350. The output can also be fed back into the state tracking circuit 420 to transition from tracking an unlock state to a lock state.

The pulse generating circuit 350 receives the lock command and generates, using power drawn from the onboard power source, the pulse of electric current that aligns the polarity of the electro-permanent magnets with the permanent magnets. This provides the desired fail-secure protection, whereby the ACEPM lock enters a lock state if it was previously in an unlock state and power from the external power source is lost.

Figure 5:
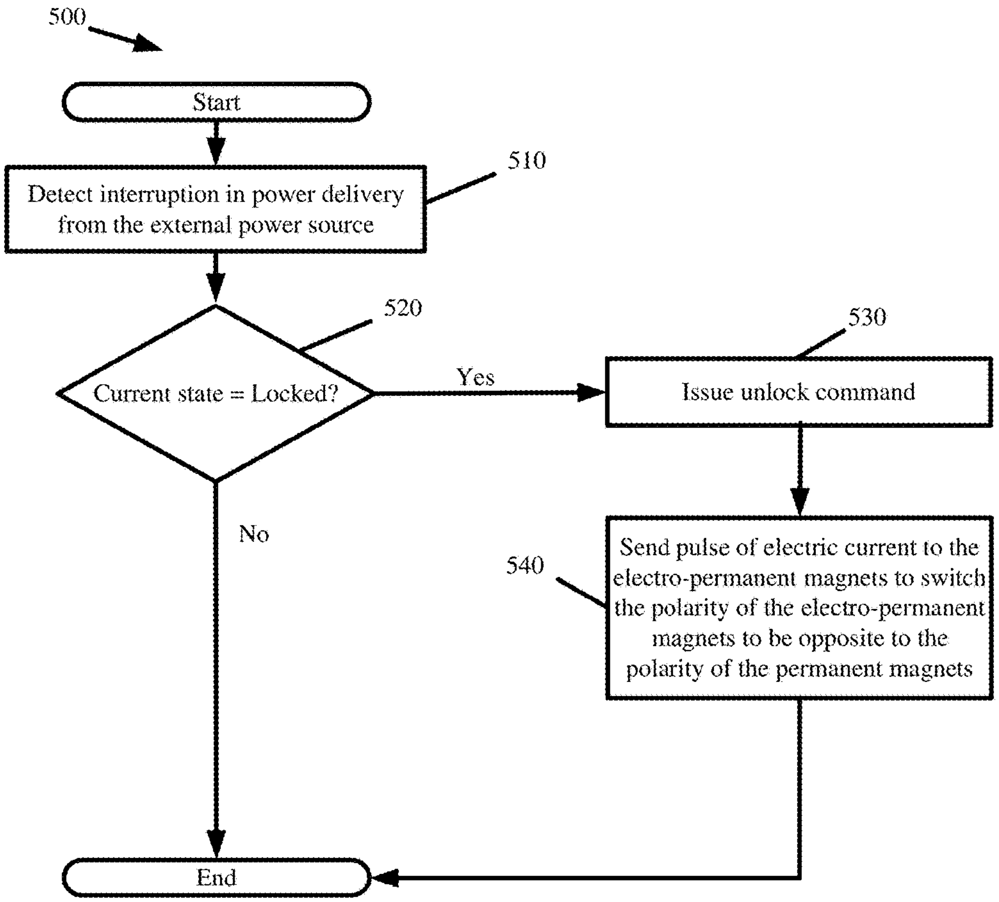
FIG. 5 presents a process for implementing the fail-safe protections on the ACEPM lock in accordance with some embodiments.

The state override circuits can be easily adapted to provide fail-safe protections instead of fail-secure protections. FIG. 5 presents a process 500 for implementing the fail-safe protections on the ACEPM lock in accordance with some embodiments.

The process 500 commences in response to detecting (at 510) an interruption in power delivery from the external power source. In response to the detected loss of power from the external power source, the process determines (at 520) the current access state of the ACEPM lock, wherein the access state indicates whether the polarity of the electro-permanent magnets is aligned with or opposite to the polarity of the permanent magnets.

In response to the ACEPM lock being in an unlock state, nothing changes and the process ends. In response to the ACEPM lock being in a lock state, the process issues (at 530) an unlock command to the pulse generating circuit. The pulse generating circuit produces and sends (at 540) the pulse of electric current to the electro-permanent magnets causing the polarity of the electro-permanent magnets to switch and be opposite to the polarity of the permanent magnets.

Figure 6:
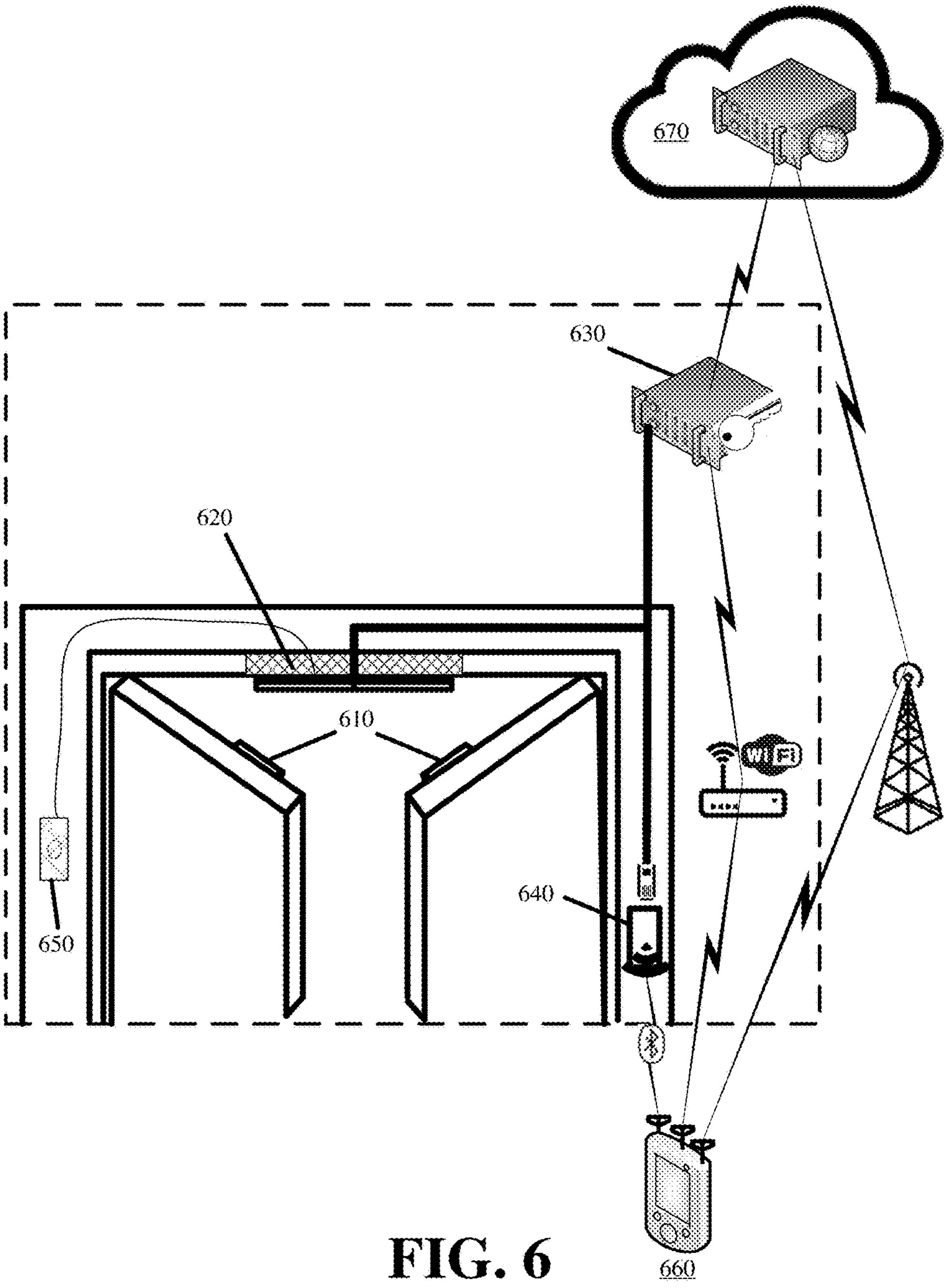
FIG. 6 illustrates a complete access control system for restricting access through a physical barrier with the ACEPM lock of some embodiments.

FIG. 6 illustrates a complete access control system for restricting access through a physical barrier with the ACEPM lock of some embodiments. The physical barrier opens and closes access to a restricted space. The armature plate 610 is affixed to the physical barrier with the ACEPM lock 620 being located on an adjacent wall or structure. The ACEPM lock 620 includes network connectivity to an access control unit 630. The access control unit 630 communicates with a reader 640 placed adjacent to the door outside of the restricted space. Although FIG. 6 illustrates the reader 640 as being separate from the ACEPM lock 620, some embodiments directly integrate the functionality of the reader 640 as part of the ACEPM lock 620, thereby eliminating the need for a separate component. The ACEPM lock 620 also includes connectivity to a button 650, switch, or motion sensor inside the restricted space.

A wireless client device 660 enters within range of the reader 640. The range of the reader 640 differs depending on the wireless connectivity used to establish communications between the reader 640 and the client device 660. The range will be less when communicating with Bluetooth or BLE, and greater when communicating with WiFi or LTE.

The client device 660 establishes a wireless connection to the reader 640 before sending an unlock request to the reader 640. The reader 640 forwards the request to the access control unit 630. The access control unit 630 authorizes the client device 660 based on the request and locally configured access permissions. The access control unit 630 then issues an unlock command to the ACEPM lock 620. In response to the unlock command, the pulse generating circuit of the ACEPM lock 620 produces the pulse of electric current that causes the polarity of the electro-permanent magnets to be directly opposite to the fixed polarity of the permanent magnets.

In some embodiments, the reader 640 includes a keypad or other form of direct input. Humans can enter codes through the keypad. The reader 640 can issue the lock and unlock commands in response to valid codes. The reader 640 could also pass the codes to the access control unit 630 for authorization and the access control unit 630 issues the commands to the ACEPM lock 620 when valid codes are entered.

FIG. 6 illustrates alternative means with which the client device 660 can initiate the unlock request. The client device 660 can bypass the reader 640 and directly send the request to the access control unit 630 via a long-range wireless network.

The client device 660 could also submit the request to a cloud server 670 operating as part of the system. The cloud server 670 can relay the request to the correct access control unit 630 for authorization of the client device 660 request. Alternatively, the cloud server 670 could authorize the client device 660 and pass the authorization decision to the access control unit 630 that then sends commands to the ACEPM lock 620.

In some embodiments, the cloud server 670 is an administrative server that updates the access control unit 630 with access permissions for users or client devices that are permitted access. In some such embodiments, the access control unit 630 authorizes access to the restricted space based on the updated access permissions provided by the cloud server 670. The access permissions could also be updated at the access control unit 630.

As noted above, the ACEPM lock 620 could also locally authorize user or client device access. In such cases, the access control unit passes updated access credentials to the ACEPM lock 620 via the established network connectivity. The access credentials are stored to the ACEPM lock 620 memory. The ACEPM lock 620 can directly receive requests from the reader 640 or client device 660 and locally authorizes access in response to the received requests and stored access permissions.

The button 650, switch, or motion sensor directly sends lock or unlock commands to the ACEPM lock 620. The button 650, switch, or motion sensor is typically located on the inside of the restricted space to allow people to exit the restricted space without authorization.

In some embodiments, the ACEPM lock 620 includes a timer (not shown). The timer controls when the ACEPM lock 620 accepts input from the button 650, reader 640, client mobile devices, and other devices.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A locking system for locking and unlocking a moveable physical barrier restricting access to a physical space, the locking system comprising:

- an armature plate affixing to the moveable physical barrier, the armature plate comprising a metal or alloy with a flat section that attracts to a magnetic force; and
- an access control electro-permanent magnetic (ACEPM) lock mounted off the moveable physical barrier, the ACEPM lock comprising:
  - at least one stationary permanent magnet with a fixed polarity in a first direction;
  - at least one stationary electro-permanent magnet with switchable polarity, the at least one electro-permanent magnet fixed adjacent to and in parallel with the at least one permanent magnet;
  - a communication port receiving one or more of lock and unlock inputs;
  - a pulse generating circuit communicably coupled to the communication port, the pulse generating circuit producing a first pulse of electric current in response to unlock input from the communication port and a second pulse of electric current in response to lock input from the communication port; and
  - wiring transferring pulses of electric current from the pulse generating circuit to the at least one electro-permanent magnet, wherein said at least one electro-permanent magnet switches polarity to the first direction in response to transferring the first pulse of electric current over said wiring to the at least one electro-permanent magnet, and wherein said at least one electro-permanent magnet switches polarity to a second direction directly opposite to the first direction in response to transferring the second pulse of electric current over said wiring to the at least one electro-permanent magnet.

2. The locking system of claim 1, wherein the armature plate comprises an overhang with one or more apertures, and screws entering through the one or more apertures and the physical barrier in affixing the armature plate to the physical barrier.

3. The locking system of claim 1, wherein the ACEPM lock further comprises an external power source and an onboard power source, the onboard power source powering said ACEPM lock in response to a loss of power from the external power source.

4. The locking system of claim 3, wherein the ACEPM lock further comprises a fail-secure state override circuit, wherein the state override circuit tracks a current state of the ACEPM lock based on the lock and unlock inputs from the communication port, and provides the lock input to the pulse generating circuit in response to a loss of power from the external power source and the current state of the ACEPM lock being unlocked.

5. The locking system of claim 3, wherein the ACEPM lock further comprises a fail-safe state override circuit, wherein the state override circuit tracks a current state of the ACEPM lock based on input from the communication port, and provides the unlock input to the pulse generating circuit in response to a loss of power from the external power source and the current state of the ACEPM being locked.

6. The locking system of claim 3, wherein the onboard power source is one of a battery or a capacitor.

7. The locking system of claim 1 further comprising an access control unit sending said unlock input through the communication port in response to receiving access credentials from a client device requesting access past the physical barrier and successfully authenticating said client device based on the access credentials at the access control unit.

8. The locking system of claim 7, wherein the access control unit communicably couples to the communication port through one of a wired or wireless network connection.

9. The locking system of claim 1, wherein the communication port comprises a wireless radio, the wireless radio establishing network connectivity to a remote device authorizing client access to said physical space.

10. The locking system of claim 1, wherein the ACEPM lock further comprises a memory storing access permissions granting a subset of a plurality of users access through the physical barrier to the physical space, wherein the communication port produces the unlock input based on said access permissions from memory and requests from different devices of the plurality of users.

11. An access control system comprising:

- an armature plate comprising a flat section of a metal or alloy that is magnetically attractive;
- an access control electro-permanent magnetic (ACEPM) lock comprising a first unpowered lock state and a second unpowered unlock state, wherein the ACEPM lock creates a magnetic field attracting said armature plate, and retains said magnetic field without continuous electric current in the first unpowered lock state, and wherein the ACEPM lock cancels out said magnetic field in the second unpowered unlock state without continuous electric current, the ACEPM comprising:
  - at least one stationary permanent magnet with a fixed polarity;
  - at least one stationary electro-permanent magnet with switchable polarity physically aligned with and fixed adjacent to the at least one permanent magnet; and
  - a first circuit communicably coupled to the at least one electro-permanent magnet, the first circuit switching the ACEPM lock between the first unpowered lock state and the second unpowered unlock state, wherein the first circuit sends a pulse of electric current to the at least one electro-permanent magnet with the ACEPM lock in the first unpowered lock state in response to an authorized request to open the physical barrier, wherein said pulse of electric current switches polarity of the at least one electro-permanent magnet from polarity that is aligned with polarity of the at least one permanent magnet to polarity that is opposite to polarity of the at least one permanent magnet with the opposite polarities canceling out said magnetic field and releasing the armature plate from the ACEPM lock.

12. The access control system of claim 11, wherein the ACEPM lock further comprises network connectivity from which an unlock command based on the authorized request passes to the ACEPM lock.

13. The access control system of claim 12 further comprising a reader integrated with or located adjacent to the ACEPM lock, said reader receiving requests to open the physical barrier.

14. The access control system of claim 12 further comprising an access control unit storing access permissions and sending unlock commands to the ACEPM lock over said network connectivity in response to successfully authenticating a subset of requests to open the physical barrier using the access permissions.

15. The access control system of claim 11, wherein the ACEPM lock further comprises a second circuit communicably coupled to the first circuit, the second circuit tracking access state and power state of the ACEPM lock.

16. The access control system of claim 15, wherein the second circuit further signals the first circuit with an unlock command in response tracking a locked access state, loss of power, and fail-safe operation of the access control system, and signals the first circuit with a lock command in response to tracking an unlocked access state, loss of power, and fail-secure operation of the access control system, wherein the first circuit switches said polarity of the at least one electro-permanent magnet to align with polarity of the at least one permanent magnet in response to said unlock command from the second circuit, and wherein the first circuit switches said polarity of the at least one electro-permanent magnet to be opposite to polarity of the at least one permanent magnet in response to said lock command from the second circuit.

17. A stationary and latchless access control electro-permanent magnetic (ACEPM) lock comprising:

at least one permanent magnet with a fixed polarity in a first direction;

at least one electro-permanent magnet with polarity switching between the first direction and a reversed second direction in response to a pulse of electric current, the at least one electro-permanent magnet stationary and fixed adjacent to the at least one permanent magnet;

first wiring transferring power from an external power source;

second wiring transferring power from an onboard power source;

a circuit receiving power from said first wiring and said second wiring, the circuit controls a state of a magnetic field generated from the at least one permanent magnet and the at least one electro-permanent magnet in the event of power loss with said pulse of electric current and said power from the onboard power source transferring over the second wiring, wherein controlling the state of the magnetic field comprises at least one of:

(i) automatically switching polarity of the at least one electro-permanent magnet from the first direction to the second direction and removing a lock established with said magnetic field based on said circuit sending said pulse of electric current in response to an interruption to power transferring from the external power source over the first wiring and polarity of the at least one permanent magnet and the at least one electro-permanent magnet being aligned in the first direction, and (ii) automatically switching polarity of the at least one electro-permanent magnet from the second direction to the first direction and establishing a lock with said magnetic field based on said circuit sending said pulse of electric current in response to an interruption to power transferring from the external power source over the first wiring and polarity of the at least one permanent magnet and the at least one electro-permanent magnet being reversed, wherein a state change produced by the circuit is maintained after sending said pulse of electric current without further electric current, and said ACEPM lock is free of mechanical moving parts.

18. The ACEPM lock of claim 17, wherein the pulse of electric current lasts fewer than 500 milliseconds.

19. The ACEPM lock of claim 17 further comprising third wiring connecting the circuit to different ends of the at least one electro-permanent magnet.

20. The ACEPM lock of claim 17 further comprising non-volatile memory tracking alignment of the electro-permanent magnet polarity relative to the at least one permanent magnet.

* * * * *